United States Patent
Lindner et al.

(10) Patent No.: US 8,673,484 B2
(45) Date of Patent: Mar. 18, 2014

(54) ELECTROCHEMICAL ELEMENT WITH A REDUCED INTERNAL RESISTANCE

(75) Inventors: Hans Jürgen Lindner, Ellwangen (DE); Claus Christian Fischer, Ellwangen (DE); Horst Wagner, Rosenberg (DE)

(73) Assignee: Varta Microbattery GmbH (DE)

( * ) Notice: Subject to any disclaimer, the term of this patent is extended or adjusted under 35 U.S.C. 154(b) by 4 days.

(21) Appl. No.: 13/390,547

(22) PCT Filed: Jul. 12, 2010

(86) PCT No.: PCT/EP2010/059959
§ 371 (c)(1),
(2), (4) Date: Feb. 15, 2012

(87) PCT Pub. No.: WO2011/023447
PCT Pub. Date: Mar. 3, 2011

(65) Prior Publication Data
US 2012/0141865 A1    Jun. 7, 2012

(30) Foreign Application Priority Data

Aug. 26, 2009  (DE) .......................... 10 2009 039 945

(51) Int. Cl.
*H01M 2/02*    (2006.01)
(52) U.S. Cl.
USPC ......................................... 429/164; 429/163
(58) Field of Classification Search
USPC ....................................................... 429/164
See application file for complete search history.

(56) References Cited

U.S. PATENT DOCUMENTS

| 4,032,695 | A | 6/1977 | Coibion |
| 5,283,139 | A | 2/1994 | Newman et al. |
| 6,472,099 | B1 * | 10/2002 | Lee et al. ...................... 429/206 |
| 6,805,995 | B2 | 10/2004 | Yoshinaka et al. |
| 2001/0009741 | A1 | 7/2001 | Durkot et al. |

FOREIGN PATENT DOCUMENTS

| DE | 26 28 080 A1 | 2/1977 |
| DE | 35 43 425 A1 | 6/1987 |
| DE | 694 34 150 T2 | 9/2005 |
| DE | 600 34 870 T2 | 1/2008 |
| WO | 01/97302 A2 | 12/2001 |
| WO | 02/084766 A2 | 10/2002 |

* cited by examiner

Primary Examiner — Barbara Gilliam
Assistant Examiner — Gary Harris
(74) Attorney, Agent, or Firm — DLA Piper LLP (US)

(57) ABSTRACT

An electrochemical element has a housing having an inside surface, a first electrode resting adjacent an inside surface of the housing and defining a cavity, the first electrode including at least two individual segments adjacent one another in a 2-dimensional manner via first contact surfaces and rest via further contact surfaces adjacent the inside surface, a second electrode of opposite polarity arranged inside the cavity, a separator arranged between the first and second electrodes, and at least one connector arranged between the first contact surfaces which connects the segments electrically conductively and which is annular or ring-shaped and includes at least one strip-shaped projection formed on an outside portion thereof.

15 Claims, 2 Drawing Sheets

ELECTROCHEMICAL ELEMENT WITH A REDUCED INTERNAL RESISTANCE

RELATED APPLICATIONS

This is a §371 of International Application No. PCT/EP2010/059959, with an international filing date of Jul. 12, 2010 (WO 2011/023447 A1, published Mar. 3, 2011), which is based on German Patent Application No. 10 2009 039 945.3, filed Aug. 26, 2009, the subject matter of which is incorporated by reference.

TECHNICAL FIELD

This disclosure relates to an electrochemical element with a housing, two electrodes, one of which rests adjacent the inside surface of the housing and defines a cavity in which the other electrode is arranged, and a separator arranged between the electrodes.

BACKGROUND

Cells constructed in this way are often alkali-manganese batteries, i.e., cells with a positive electrode of manganese dioxide ($MnO_2$) and a negative electrode of zinc and an alkaline electrolyte, the latter being in particular based on potassium hydroxide (KOH). Generally, the positive electrode takes the form of a hollow cylinder, the outside surface of which contacts the inside surface of a cup-shaped cell housing. The negative electrode is arranged inside the positive electrode as is a separator for isolating the positive electrode physically from the negative electrode and at the same time allowing ion transport between the two electrodes.

The negative electrode is generally constructed by mixing the active zinc composition in the form of a zinc alloy powder with the alkaline electrolyte and a gelling agent. The mixture is distributed in the cavity formed inside the positive electrode or the cavity is filled with the mixture. A collector assembly is then inserted into the open end of the cup-shaped cell housing. The negative electrode is in this case preferably contacted via a pin-shaped collector which, on insertion of the collector assembly, is pressed into the cavity or into the negative electrode located therein. Finally, the cell housing is closed, generally by introducing a cover which is fitted over the collector assembly. To seal the cell, the walls of the cell housing may be crimped over this cover.

For manufacturing reasons in particular, the positive electrode in the form of a hollow cylinder is generally not introduced in one piece into the cup-shaped cell housing, but rather in the form of individual segments, which then form the positive electrode when assembled. For example, a disk-shaped segment may be inserted into a cylindrical, cup-shaped cell housing, on which a plurality of annular (ring-shaped) segments are then stacked. The inner diameter of the annular segments then determines the volume and diameter of the cavity for the negative electrode. The outer diameters of both the disk-shaped and annular segments are generally matched precisely to the corresponding inner diameter of the cup-shaped cell housing.

Electrochemical cells constructed as described certainly have a very high capacity. On the other hand, they also have the common feature of relatively high internal resistance which may lead to poor discharge characteristics. Those cells are not ideally designed for pulsed discharge profiles and for discharge under high current densities in particular, which means that they are not suitable or are suitable to only a limited degree for many applications.

It could therefore be helpful to improve the discharge characteristics of the above-mentioned generic electrochemical elements and expand their potential range of application.

SUMMARY

We provide an electrochemical element including a housing having an inside surface, a first electrode resting adjacent an inside surface of the housing and defining a cavity, the first electrode including at least two individual segments adjacent one another in a 2-dimensional manner via first contact surfaces and rest via further contact surfaces adjacent the inside surface, a second electrode of opposite polarity arranged inside the cavity, a separator arranged between the first and second electrodes, and at least one connector arranged between the first contact surfaces which connects the segments electrically conductively and which is annular or ring-shaped and includes at least one strip-shaped projection formed on an outside portion thereof.

DETAILED DESCRIPTION

Figure 1:
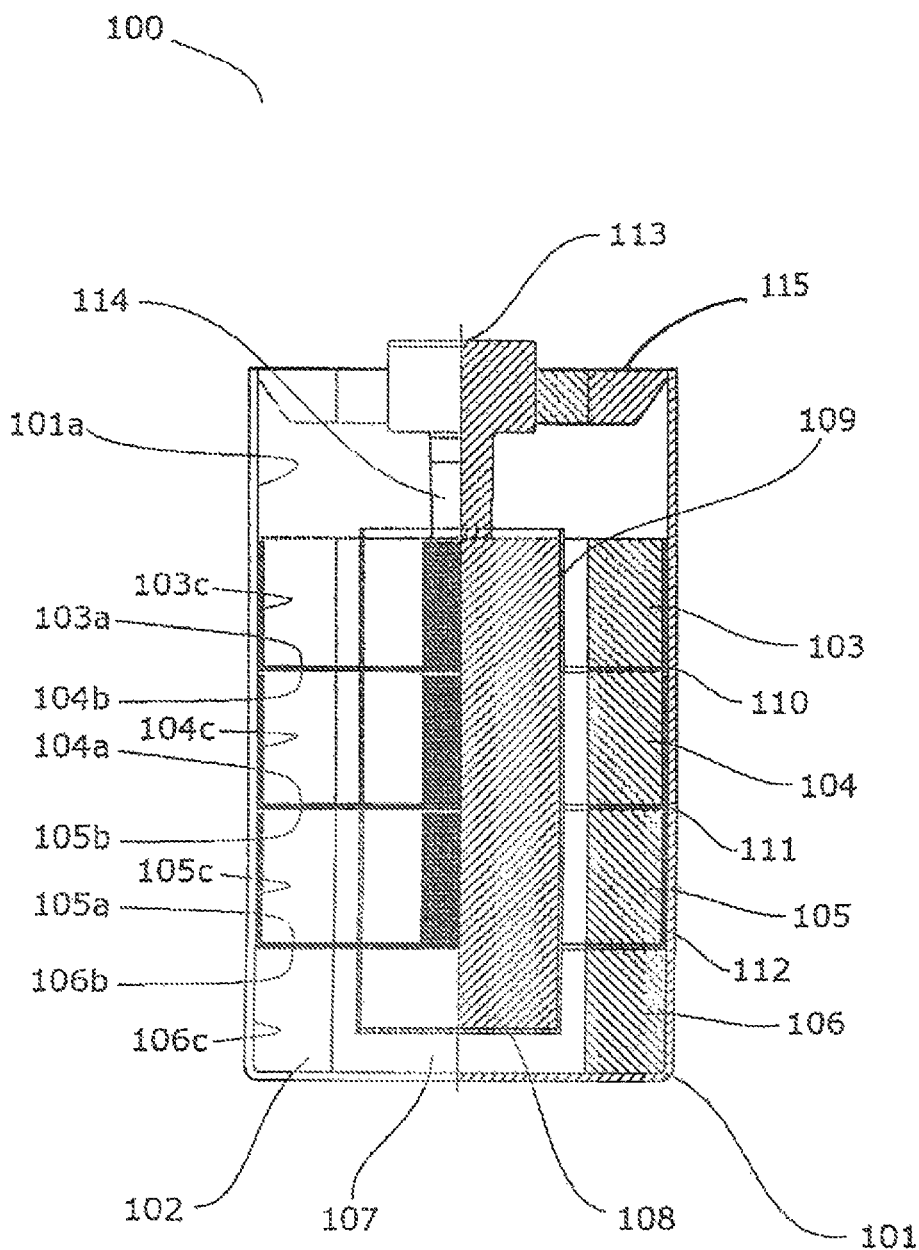
FIG. 1 shows a schematic view of one example of an electrochemical element.

Like the above-described generic electrochemical elements, our electrochemical element comprises a housing with an inside surface, a first electrode resting adjacent the inside surface of the housing and simultaneously defining a cavity, and a second electrode of opposite polarity arranged within the cavity. In addition, an electrochemical element according comprises a separator arranged between the first and the second electrode.

The first electrode thereby comprises at least two, preferably three or more individual segments. These on the one hand are adjacent one another in a 2-dimensional manner via first contact surfaces and on the other hand rest via further contact surfaces in a 2-dimensional manner adjacent the inside surface of the housing.

The second electrode body generally fills the cavity inside the first electrode substantially completely. Contacting thereof may proceed, for example, via a pin-shaped collector, as described above.

The electrochemical element is distinguished in particular in that at least one connector is arranged between the first contact surfaces of the at least two individual segments via which the individual segments are adjacent one another in a 2-dimensional manner, which connector connects the segments electrically conductively.

We surprisingly found that, by arranging at least one such connector between the segments, it was possible to dramatically reduce the internal resistance of electrochemical elements constructed as described above. In some cases, the internal resistance could be reduced by markedly more than half, which naturally has a positive effect on the potential range of application of the electrochemical element. The latter is also more suitable than comparable known electrochemical elements for applications in which the above-mentioned demanding pulsed discharge profiles arise or for discharge under high current densities.

Our electrochemical element is preferably a conventional commercial battery. The housing of an electrochemical element is preferably substantially cylindrical. Particularly preferably, the housing of an electrochemical element is of a standard size such as, for example, AA (Mignon), AAA (Micro), C (Baby) or D (Mono).

As with known elements, with our electrochemical element at least part of the first electrode, optionally indeed the entire first electrode, is preferably also constructed as a hollow cylinder. To this end, the first electrode may, for example, comprise one disk-shaped and one or more annular individual segments preferably in each case of identical outer diameter. If, for example, the disk-shaped individual segment is inserted into the bottom of a cup-like substantially cylindrical housing and one or more of the annular individual segments are stacked thereon, the result—assuming a suitable outer diameter of the annular segments—is the above-mentioned first electrode resting adjacent the inside surface of the housing together with the cavity in which the second electrode is arranged. The volume or dimensions of the cavity are in this case determined by the dimensions and number of the annular individual segments (in particular by the inner diameter thereof).

Our electrochemical element preferably comprises two or more of the above-mentioned annular (ring-shaped) individual segments each of identical outer and inner diameter. Particularly preferably, it comprises a first electrode which consists of these two or more annular individual segments. The at least one connector is then preferably respectively arranged between adjacent segments such that adjacent segments are each connected together conductively via the at least one connector.

The part of the first electrode constructed as a hollow cylinder or the first electrode in its entirety accordingly consists particularly preferably of a plurality of stacked annular individual segments each of identical outer and inner diameter. Consequently, it is also preferable for the cavity within the first electrode which is of course formed by the stacked individual segments to be substantially cylindrical.

The annular (ring-shaped) individual segments preferably exhibit a height which is only small in comparison with their outer diameter. The contact surfaces at which the individual segments are adjacent one another in a 2-dimensional manner are preferably the end faces of the segments. The size of the contact surfaces is accordingly preferably defined by the outer and inner diameter of the annular (ring-shaped) individual segments.

As a connector, an electrochemical element preferably comprises a connector of a material of a higher electrical conductivity than the material of which the first electrode consists. Connectors of metal, in particular of a metal foil or a metal sheet, are particularly suitable.

Alternatively, however, it is also possible to arrange at least one contact layer as the connector between the segments, which contact layer may, for example, be formed from a composition with good electrical conductivity. Corresponding conductive pastes, which may, for example, contain metal particles or conductivity-enhancing components such as carbon black or graphite, are known.

Preferably, the at least one connector does not extend just onto the region between the contact surfaces of the segments of the first electrode of the electrochemical element. Instead, it may be preferable for the at least one connector to extend as far into the contact region between the further contact surfaces of the segments and the inside surface of the housing and thus to connect the segments electrically conductively not only to one another but also to the housing.

At this point it should once again be made clear that also in the above-mentioned known electrochemical elements there are electrical connections between the inside surface of the housing and the electrode resting adjacent the inside surface and between individual segments of the positive electrode. Use of the at least one connector, however, improves electrical conduction between these components to an extent which could not have been foreseen. By and in itself a very simple technical measure, introduction of a connector between two components of an electrochemical element, which are in contact and are in themselves already electrically conductive, a technical effect of significant positive impact is thus achieved.

The at least one connector is preferably of annular (ring-shaped) construction, in particular its outer and/or inner diameter preferably corresponds to the outer and/or inner diameter of the annular (ring-shaped) individual segments used. Preferably, it thus optimally fills the contact region between the individual segments. In instances in which it additionally also extends into the contact region between the further contact surfaces of the segments and the inside surface of the housing, it is preferable for the annular (ring-shaped) connector to comprise at least one preferably strip-shaped projection formed on an outside portion of the ring.

The first electrode of an electrochemical element is preferably the positive electrode. The second electrode of an electrochemical element is accordingly preferably the negative electrode.

The positive electrode is particularly preferably a manganese dioxide electrode. The negative electrode is particularly preferably a zinc electrode. The electrochemical element is accordingly in particular an alkali-manganese cell. As such it naturally preferably also comprises a corresponding alkaline electrolyte.

The described and further features of the electrochemical element are also clear from the description below of preferred examples illustrated in the drawings. Individual features may here be realized on their own or in combination with one another. The examples described serve merely to explain and enable a better understanding and should not be understood to be in any way limiting.

FIG. 1 is a schematic illustration of a preferred example of an electrochemical element 100. The electrochemical element 100 is shown partly in cross-section (right), partly in a non-sectional view showing concealed edges (left). It comprises on the one hand a cup-shaped housing 101 with a substantially cylindrical shell and a substantially flat bottom region of circular construction. The first electrode 102, in the form of a hollow cylinder, rests adjacent the inside surface 101a of the housing, the first electrode being composed of the individual segments 103, 104, 105 and 106. These individual segments are each of annular (ring-shaped) construction and each exhibit identical outer and inner diameters. Inside the housing 101 they are arranged in a stack and define at their center the cavity 107 in which the negative electrode 108 is arranged, which is in turn surrounded by a cup-shaped separator 109 which isolates the electrodes 102 and 108 from one another. The above-mentioned individual segments 103, 104, 105 and 106 are adjacent one another in a 2-dimensional manner via first contact surfaces 103a, 104b, 104a, 105b, 105a and 106b (the respective end faces of adjacent segments). Via further contact surfaces 103c, 104c, 105c and 106c (the respective circumferential surfaces of the annular individual segments 103, 104, 105 and 106) they are adjacent the inside surface 101a of the housing 101 in a 2-dimensional manner. Between the first contact surfaces 103a and 104b, 104a and 105b and 105a and 106b there in each case arranged a connector (110, 111 and 112) which connects the segments 103, 104, 105 and 106 electrically conductively. This connector does not, however, only cover the region between the first contact surfaces 103a, 104b, 104a, 105b, 105a and 106b, but rather extends as far as into the contact region between the further contact surfaces 103c, 104c and 105c of the corresponding segments and the inside surface of the housing 101 and thus both connects the individual segments 103, 104, 105 and 106 together and the segments 103, 104 and 105 to the housing 101.

The cup-shaped housing 101 is thus one terminal of the electrochemical element 100. The other terminal 113 is located at the open end of the housing cup 101. From this the pin-shaped collector 114 projects into the cavity 107 inside the first electrode 102 and there contacts the second electrode 108 arranged therein. The cover 115, which simultaneously isolates the terminal 113 from the housing 101, seals the open end of the housing cup 101.

Figure 2:
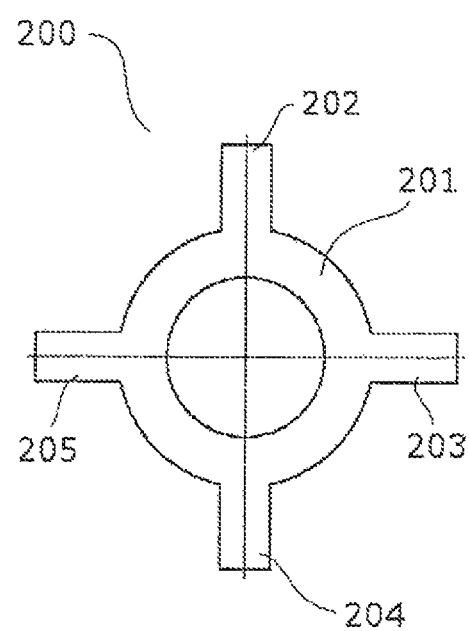
FIG. 2 shows a preferred example of a connector for electrical contacting of individual segments of the first electrode.

The connector 200 illustrated in FIG. 2 is a metal foil 201 of annular (ring-shaped) construction with four strip-shaped projections 202, 203, 204 and 205. The connector 200 corresponds in form and function to the connectors 110, 111 and 112 fitted in the electrochemical element 100 illustrated in FIG. 1. The outer and inner diameters of the ring 201 correspond exactly with the outer and inner diameters of the individual segments 103, 104, 105 and 106 of the first electrode 108 illustrated in FIG. 1. If such a connector is inserted flat into a cup-shaped housing 101 as shown in FIG. 1, the strip-shaped projections 202, 203, 204 and 205 bend upwards. Thus, if three such connectors as illustrated in FIG. 1 are arranged as connectors 110, 111 and 112 between the individual segments 103, 104, 105 and 106, the strip-shaped projections 202, 203, 204 and 205 may form the above-mentioned electrically conductive connection between the further contact surfaces 103c, 104c and 105c of the corresponding segments and the inside surface 101a of the housing 101. The annular part 201 of the connector 200 then on the other hand connects the segments 103, 104, 105 and 106 together.

The invention claimed is:

1. An electrochemical element, comprising:
   a housing having an inside surface;
   a first electrode resting adjacent an inside surface of the housing and defining a cavity, the first electrode comprising at least two individual segments adjacent one another in a 2-dimensional manner via first contact surfaces and rest via further contact surfaces adjacent the inside surface;
   a second electrode of opposite polarity arranged inside the cavity;
   a separator arranged between the first and second electrodes, and
   at least one connector arranged between the first contact surfaces which connects the segments electrically conductively and which is annular or ring-shaped and comprises at least one strip-shaped projection formed on an outside portion thereof.

2. The electrochemical element as claimed in claim 1, wherein the housing is substantially cylindrical.

3. The electrochemical element as claimed in claim 1, wherein at least part of the first electrode is a hollow cylinder.

4. The electrochemical element as claimed in claim 1, wherein the first electrode comprises at least one disk-shaped and at least one annular (ring-shaped) individual segment of in each case substantially identical outer diameter.

5. The electrochemical element as claimed in claim 1, wherein the first electrode comprises at least two annular (ring-shaped) individual segments of in each case substantially identical outer and inner diameter.

6. The electrochemical element as claimed in claim 3, wherein at least the part of the first electrode in the form of a hollow cylinder consists of one or more stacked annular (ring-shaped) individual segments of in each case substantially identical outer and inner diameter.

7. The electrochemical element as claimed in claim 4, wherein the contact surfaces, at which the individual segments are adjacent one another in a 2-dimensional manner, are defined by the outer and inner diameters of the annular individual segments.

8. The electrochemical element as claimed in claim 1, wherein the cavity inside the first electrode is substantially cylindrical.

9. The electrochemical element as claimed in claim 1, wherein the connector is metal.

10. The electrochemical element as claimed in claim 1, wherein the connector is a metal foil or a metal sheet.

11. The electrochemical element as claimed in claim 1, wherein the connector comprises at least one contact layer of an electrically conductive composition.

12. The electrochemical element as claimed in claim 1, wherein the at least one connector extends as far as into the contact region between the further contact surfaces of the segments and the inside surface of the housing and connects the segments electrically conductively to the housing.

13. The electrochemical element as claimed in claim 1, wherein the at least one connector is of annular (ring shaped) construction, and its outer and/or inner diameter corresponds to the outer and/or inner diameter of the annular (ring-shaped) individual segments.

14. The electrochemical element as claimed in claim 1, wherein the first electrode is a positive electrode and the second electrode is a negative electrode.

15. The electrochemical element as claimed in claim 14, wherein the positive electrode is a manganese dioxide electrode and the negative electrode is a zinc electrode.

* * * * *